Figure 1:
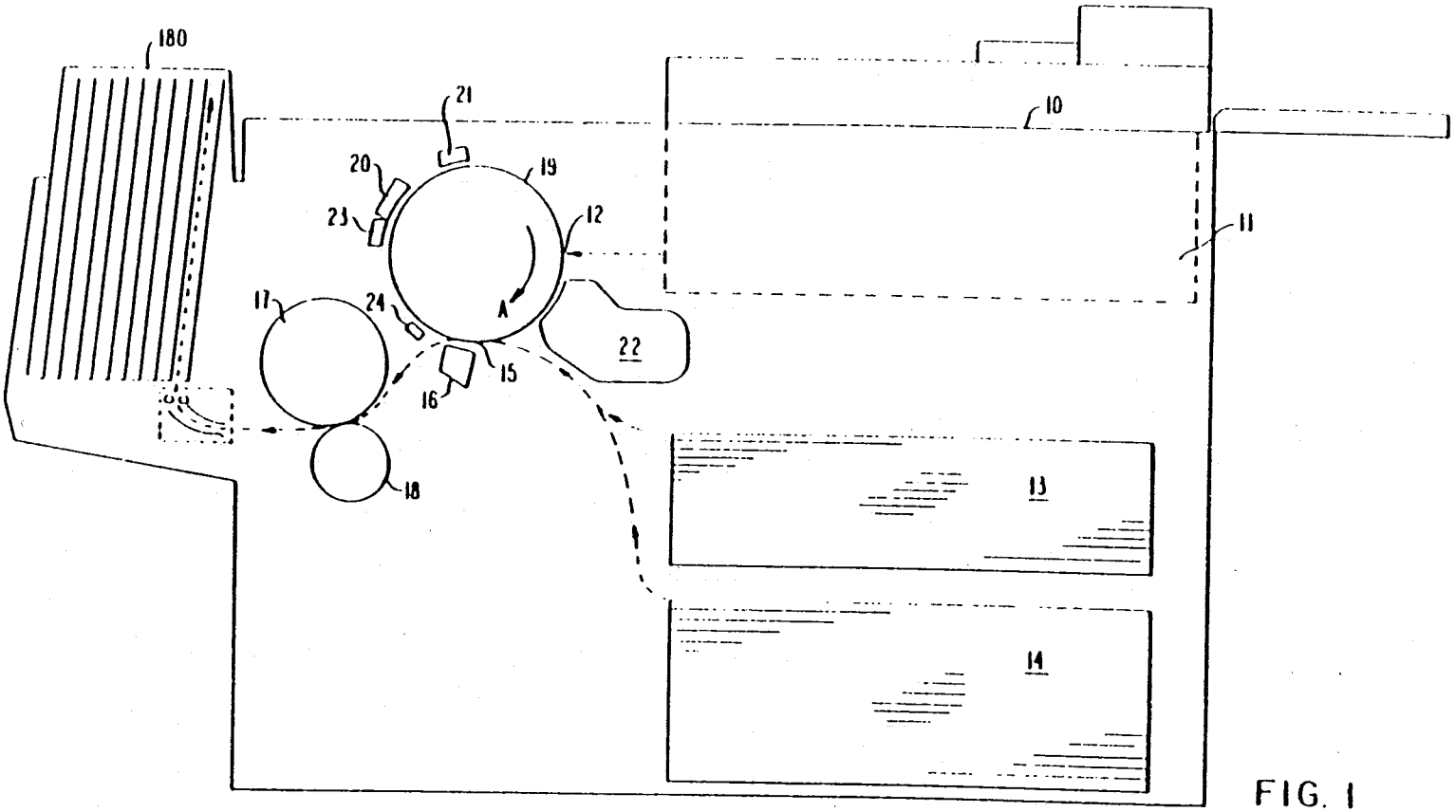
Figure 2:
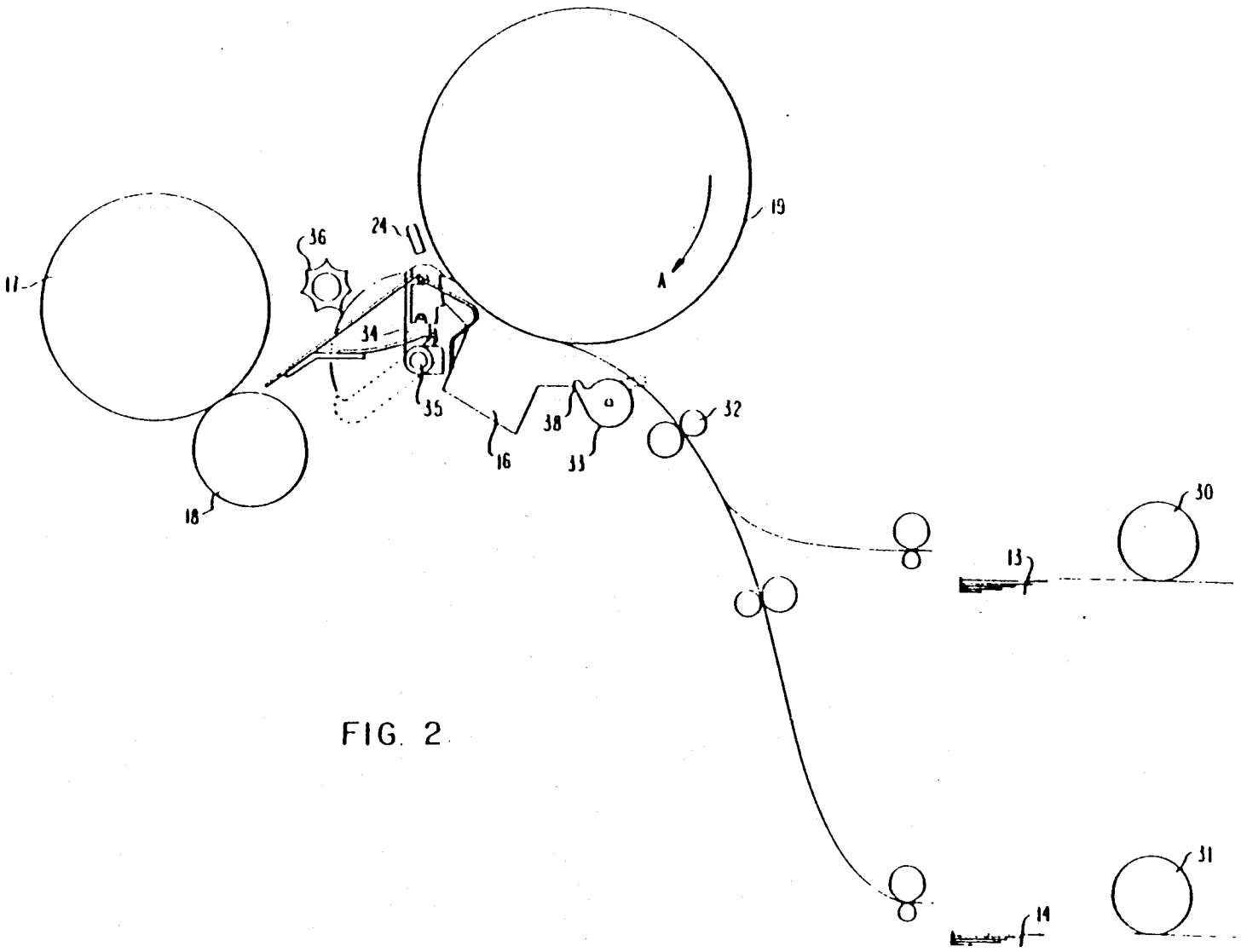
Figure 3:
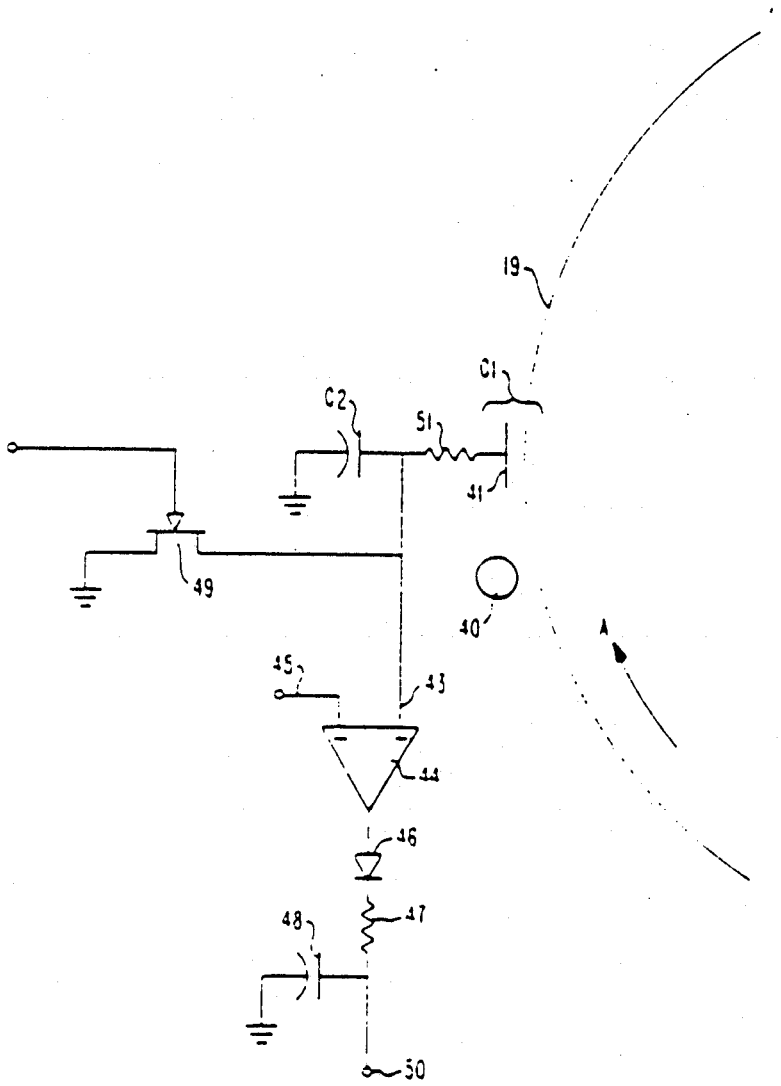

United States Defensive Publication [19] (H) [11] T105,201
Pries et al. [43] Mar. 5, 1985

[54] DOCUMENT DETECTOR

[76] Inventors: Robert W. Pries, 1424 Frontier St., Longmont, Colo. 80501; Henry W. Simpson, 3201 Tabago Ct., Lexington, Ky. 40511

[21] Appl. No.: 387,740

[22] Filed: Jun. 14, 1982

Related U.S. Application Data

[63] Continuation of Ser. No. 158,844, Jun. 12, 1980, abandoned.

[51] Int. Cl.[3] ..... G03G 15/22
[52] U.S. Cl. ..... 355/14 SH; 271/258; 271/307; 355/14 TR

[57] ABSTRACT

An electrophotographic document copier machine of the transfer type where a detector is positioned subsequent to a detach station to sense whether copy receiving material has been successfully detached from the photoreceptive surface. The detector is comprised of a light source 40 to discharge the photoreceptive material 19 to a repeatable low level and an electrostatic probe 41 to sense that low level. When an unsuccessful detach operation occurs, the probe 41 senses the much higher voltage level present on the back side of copy receiving material which has passed under a transfer corona charge generator prior to reaching the detach station and light source 40.

10 Claims, 3 Sheets Drawing,
20 Pages Specification

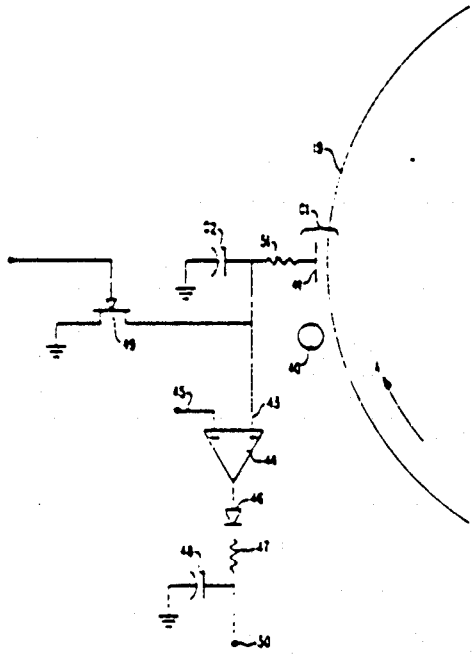

The file of this unexamined application may be inspected and copies thereof may be purchased (849 O.G. 1221, Apr. 9, 1968).